(12) United States Patent
Jia et al.

(10) Patent No.: US 7,181,391 B1
(45) Date of Patent: Feb. 20, 2007

(54) METHOD, APPARATUS, AND SYSTEM FOR BOTTOM-UP TONE INTEGRATION TO CHINESE CONTINUOUS SPEECH RECOGNITION SYSTEM

(75) Inventors: Ying Jia, Beijing (CN); Yonghong Yan, Beijing (CN); Baosheng Yuan, Singapore (SG)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 10/148,479

(22) PCT Filed: Sep. 30, 2000

(86) PCT No.: PCT/CN00/00304

§ 371 (c)(1),
(2), (4) Date: Jan. 28, 2003

(87) PCT Pub. No.: WO02/29616

PCT Pub. Date: Apr. 11, 2002

(51) Int. Cl.
G10L 15/00 (2006.01)
G10L 15/02 (2006.01)
G10L 15/14 (2006.01)

(52) U.S. Cl. .............. 704/231; 704/251; 704/256
(58) Field of Classification Search ............. 704/231, 704/236, 251, 255, 256, 256.7, 207
See application file for complete search history.

(56) References Cited

U.S. PATENT DOCUMENTS

| | | | | |
|---|---|---|---|---|
| 5,220,639 A | * | 6/1993 | Lee ............................. | 704/200 |
| 5,602,960 A | * | 2/1997 | Hon et al. .................. | 704/207 |
| 5,680,510 A | * | 10/1997 | Hon et al. .................. | 704/255 |
| 5,751,905 A | * | 5/1998 | Chen et al. ................ | 704/254 |

(Continued)

FOREIGN PATENT DOCUMENTS

| | | |
|---|---|---|
| CN | 1112269 A | 11/1995 |
| CN | 1122936 A | 5/1996 |

OTHER PUBLICATIONS

Fu, Stephen W. K., Lee, C. H., Clubb, Orville L., "*A Survey on Chinese Speech Recognition*", Department of Computer Science, City University of Hong Kong, Nov. 23, 1995.

(Continued)

*Primary Examiner*—Martin Lerner

(74) *Attorney, Agent, or Firm*—Blakely, Sokoloff, Taylor & Zafman LLP

(57) ABSTRACT

According to one aspect of the invention, a method is provided in which knowledge about tone characteristics of a tonal syllabic language is used to model speech at various levels in a bottom-up speech recognition structure. The various levels in the bottom-up recognition structure include the acoustic level, the phonetic level, the work level, and the sentence level. At the acoustic level, pitch is treated as a continuous acoustic variable and pitch information extracted from the speech signal is included as feature component of feature vectors. At the phonetic level, main vowels having the same phonetic structure but different tones are defined and modeled as different phonemes. At the word level, as set of tone changes rules is used to build transcription for training data and pronunciation lattice for decoding. At sentence level, a set of sentence ending words with light tone are also added to the system vocabulary.

29 Claims, 7 Drawing Sheets

U.S. PATENT DOCUMENTS

| | | | | |
|---|---|---|---|---|
| 5,787,230 | A | * | 7/1998 | Lee .............................. 704/235 |
| 6,067,520 | A | * | 5/2000 | Lee .............................. 704/270 |
| 6,510,410 | B1 | * | 1/2003 | Chen et al. ................. 704/251 |
| 6,553,342 | B1 | * | 4/2003 | Zhang et al. ............... 704/255 |
| 2003/0050774 | A1 | * | 3/2003 | Feng ........................... 704/205 |

OTHER PUBLICATIONS

Rabiner, L.R., Cheng, M. J., Rosenberg, A. E. and McGonegal, C. A. "*A Comparative Performance Study of Several Pitch Detection Algorithms*", IEEE Trans. Acoust., Speech and Signal Process., vol. ASSP-24, pp. 399-417, Oct. 1976.

Ross, M.J., Shaffer, H.L., Cohen, A., Freudberg, R., Manley, H.J., "*Average Magnitude Difference Function Pitch Extractor*", IEEE Trans. Acoust., Speech and Signal Process., vol. ASSP-22, pp. 353-362, Oct. 1974.

Wu, Jim Jian-Xiong, Deng. Li, Chan, Jacky, "*Modeling Context-Dependent Phonetic Units in a Continuous Speech Recognition System for Mandarin Chinese*", Proc. ICSLP96, 4 pages, Philadelphia, 1996.

Young, Steve, "*Large Vocabulary Continuous Speech Recognition: a Review*", Technical report, Cambridge University Engineering Department, Cambridge, UK, pp. 1-23, Apr. 8, 1996.

Search Report for PCT/CN00/00304; mailed Dec. 14, 2000; 2 pages.

* cited by examiner

METHOD, APPARATUS, AND SYSTEM FOR BOTTOM-UP TONE INTEGRATION TO CHINESE CONTINUOUS SPEECH RECOGNITION SYSTEM

FIELD OF THE INVENTION

The present invention relates to the field of speech recognition. More specifically, the present invention relates to a method, apparatus, and system for bottom-up tone integration to Chinese continuous speech recognition system.

BACKGROUND OF THE INVENTION

Modern speech recognition systems are based on principles of statistical pattern recognition and typically employ acoustic models and language models to decode an input sequence of observations (also referred to as acoustic events or acoustic signals) representing an input speech (e.g., a sentence or string of words) to determine the most probable sentence or word sequence given the input sequence of observations. In other words, the function of a modern speech recognizer is to search through a vast space of potential or candidate sentences and to choose the sentence or word sequence that has the highest probability of generating the input sequence of observations or acoustic events. In general, most modern speech recognition systems employ acoustic models that are based on continuous density hidden Markov models (CDHMMs).

Most state-of-the-art HMM-based speech recognition systems employ a hierarchical structure shown in FIG. 1 to model events at different levels. Based on the fact that speech is statistically stationary over a sufficiently short period of time (between 5 and 100 msec), windows of input speech, at acoustic level, are encoded as feature vectors. At phonetics level, segments of acoustic features associated with a same phonetic unit (e.g., phoneme) are then modeled by a hidden Markov model (HMM). At word level, lattices are constructed for each word by concatenating the phonetic HMMs according to their pronunciation in a dictionary. At sentence level, a search network with word nodes are finally dynamically built and pruned according to current active paths and N-gram language model. Based upon this bottom-up structure, knowledge about acoustics, phonetics, words and syntax can be built into recognition systems for performance improvement purposes.

Chinese speech recognition systems basically are based upon the above bottom-up structure as that used for English and other languages. To attain high level of recognition accuracy and system performance, certain characteristics of Chinese spoken languages (e.g., Mandarin, Cantonese, etc.) must be considered and utilized in the design of Chinese continuous speech recognition systems. Chinese is a tonal syllabic language. Each syllable is assigned one of four or five tones. For example, each syllable in Mandarin Chinese may be assigned one of the following four or five tones: a high and level tone (also referred to as the first tone herein), a rising tone (also referred to as the second tone herein), a low and up tone (also referred to as the third tone herein), a falling tone (also referred to as the fourth tone herein), and a neutral or light tone (also referred to as the fifth tone herein). As noted, certain syllables do not have the fifth tone. Tonality plays a significant role in distinguishing meaning in Chinese language. Syllables having the same phonetic structures but with different tones usually convey different meanings. Therefore, tone is an essential part for Chinese speech recognition.

Tone recognition has been the focal point of Chinese speech recognition for decades. One of the commonly used methods is to recognize the base syllables (initials and finals) and tone separately. The base syllables are recognized by a conventional HMM-based method, for example one used in English. The tone of a syllable can be recognized by classifying the pitch contour of that syllable using discriminative rules. The recognition of toned syllables is a combination of the recognition of based syllables and the recognition of tones. This method, if possible in isolated-syllable speech recognition, is not applicable in Chinese continuous speech recognition task due to various reasons. First, in continuous speech recognition, the boundaries of the syllables are not well-defined. The boundaries are determined at the end of the entire recognition process. It is very difficult to provide syllable boundary information in the early stages of acoustic recognition. Second, the actual tone contour of a syllable with one of the five tones depends on the phonetic context. The rules to determine tones from the pitch contours, if possible, will be very complicated.

In recent years, various efforts have been directed at tone integration to Chinese continuous speech recognition systems. These systems have achieved performance improvement by treating pitch as one of the acoustic parameters, same as cepstra or energy. However, these systems lack the integration of tone knowledge at other levels of speech recognition from a system view. In other words, the tone knowledge at other levels of the speech recognition process has not been considered.

BRIEF DESCRIPTION OF THE DRAWINGS

The features and advantages of the present invention will be more fully understood by reference to the accompanying drawings, in which.

DETAILED DESCRIPTION

Figure 1:
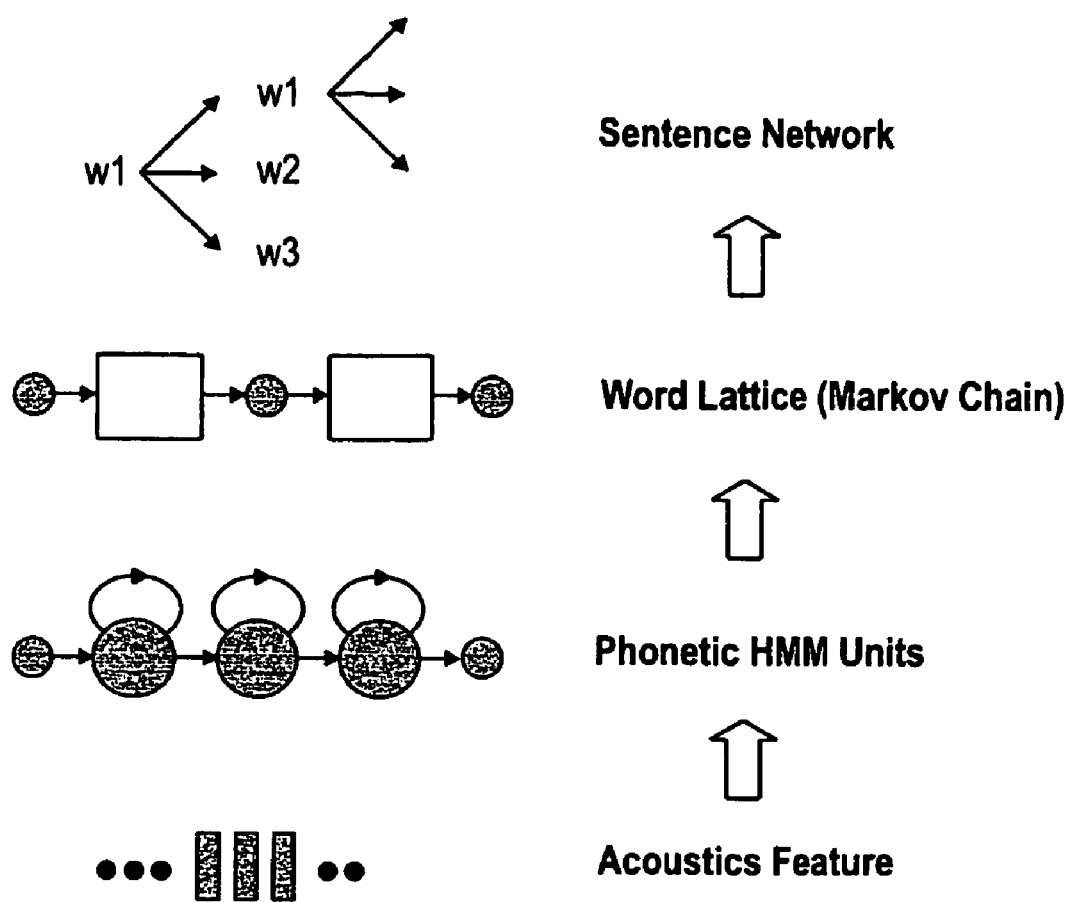
FIG. 1 is a diagram showing a bottom-up hierarchical architecture employed in speech recognition.

In the following detailed description numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, system, and machine-readable medium for providing tone integration in bottom-up architecture to Chinese continuous speech recognition systems. According to the teachings of the present invention, the tone knowledge and influence is modeled at various levels in a bottom-up recognition structure. At the acoustic level, pitch is treated as a continuous acoustic variable. In one embodiment, to make pitch estimation from a frame easy to be modeled by Gaussian mixture distribution, two voiced sections are connected by an exponential decay function plus a random noise and frequency domain filter is applied to remain spark points. Integration of pitch feature into the feature frames reduces, in a typical experiment according to one embodiment of the present invention, the word error rate (WER) from 9.9% to 8.5%. At the phonetic level, a main vowel with different tones are treated as different phonemes. Certain light-tone phonemes are also added to the phone set. In triphone building phase, a set of questions is evaluated about the tone for each decision tree node. In experiments performed according to the teachings of the present invention, the tone integration at phonetic level cut the word error rate down from 8.5% to 7.8%. At word level, a set of tone change rules is used to build transcription for training data and word lattice for decoding. Tone integration at the word level further reduces the word error rate in the recognition process (e.g., a further 0.4% reduction based upon experiments in accordance with the teachings of the present invention). At sentence level, certain sentence ending words with light tone are also added to the system vocabulary.

In one embodiment, an input signal representing an input speech in a tonal syllabic language (e.g., Mandarin Chinese) is converted into a set of feature vectors. The input speech includes one or more words and each word contains one or more phonemes. Each feature vector represents one frame of the input speech and includes a pitch feature containing pitch information for the respective frame. The phonemes contained in the input speech are determined based upon the feature vectors and a set of phonetic statistical models. Each phonetic model represents a distinct phoneme in a set of tonal phonemes. Phonemes that have the same phonetic structures but different tones are considered different phonemes and represented by different statistical models. The words contained in the input speech are then determined based upon the recognized phonemes, a set of word statistical models, and a set of tone change rules. In one embodiment, each phonetic statistical model is represented by a corresponding hidden Markov model (HMM). In one embodiment, the corresponding HMM is a continuous density HMM employing a Gaussian mixture to represent the observation probability function associated with each state in the corresponding HMM. In one embodiment, a word statistical model for each word is formed by concatenating the corresponding phonetic HMMs according to their pronunciation in a dictionary. In one embodiment, the pitch parameters are extracted from the input signal using the Average Magnitude Difference Function (AMDF). The pitch feature, in one embodiment, contains the pitch values extracted, the Mel-Frequency Cepstral Coefficients (MFCCs), the first and second derivatives of the extracted pitch parameters. In one embodiment, the pitch contour of the input signal is smoothed as follows: (1) a running average of pitch values for all valid points in the input signal is calculated; (2) the pitch value of the beginning of the input signal is defined as the running average plus a random noise; (3) the pitch value of a transition from a voiced section to an unvoiced section is defined as exponential decay function towards the running average plus a random noise. In one embodiment, the input signal is passed through a frequency domain low-pass filter to remove spikes from the input signal. The teachings of the present invention are applicable to any scheme, method and system for Chinese speech recognition. However, the present invention is not limited to Chinese speech recognition and can be applied to methods, schemes, and systems for recognizing speech in other tonal syllabic languages.

While the discussion of the present invention herein uses Mandarin Chinese as an exemplary tonal syllabic language to describe and explain the teachings of the present invention, it should be understood and appreciated by one skilled in the art that the teachings of the present invention are applicable to other Chinese tonal syllabic languages such as Cantonese and other non-Chinese tonal syllabic languages as well.

As mentioned above, Mandarin Chinese is a tonal syllabic language. There are approximately over 400 base syllables (without tone) in Mandarin. Most of these base syllables can have four or five tones associated with them. Accordingly, there are approximately over 1400 tonal syllables in Mandarin Chinese. Each syllable contains a final part and may or may not contain an initial part according to the rules shown below:

| Syllable | → | [Initial] Final |
| Initial | → | Consonant |
| Final | → | [Medial] Vowel [Coda] |
| Medial | → | Vowel |
| Coda | → | {Vowel, Nasal} |

It can be appreciated from the above description that an initial part of a syllable corresponds to a single consonant while the final part of a syllable can be either a single vowel, a diphthong; a triple vowel, a vowel with nasal ending, a diphthong with nasal ending, etc. In the one embodiment according to the teachings of the present invention, each initial and each final is treated as a single phoneme and is modeled by a corresponding continuous density hidden Markov model (HMM).

The present invention is based upon the following observations by the inventors. From a system view, tone has an influence on events at all levels in a bottom-up recognition structure. At the acoustics level, the five lexical tones are specified by the pitch contours. At the phonetics level, tone is associated with the final parts, particularly with vowel or nasal vowel. Furthermore, it has been observed by the inventors that the tone information of a syllable is concentrated in the pitch behavior of the main vowel of the syllable. Accordingly, the pitch information of the main vowel is sufficient to determine the tone of the entire syllable. With respect to continuous Mandarin Chinese, both the average values of the pitch and the time derivative of the pitch near the center of the main vowel are important in determining the tones. Also, there is a balance between the accuracy and smoothness of pitch estimation, especially at boundaries from voice parts to unvoiced parts. At word level, the tone of a syllable may change depending on the phonetic context. For example, when two third tone syllables are read or spoken together, the tone of the former one will be changed to the second tone. In other words, the former syllable's pronunciation is influenced by the right context. Therefore the context dependence of the pitch contour of a syllable can be expressed as the effect of the pitch contours of the neighboring main vowels. Furthermore, at sentence level, different sentence patterns have different light tone endings.

Based upon the observations described above and the new concept of bottom-up tone integration, a corresponding phoneme set has been designed accordingly. As described previously, each initial part and each final part of a syllable is treated as a single phoneme and modeled as such. In one embodiment, a basic set of 23 initials and 48 finals was used to design a tonal phoneme set according to the teachings of the present invention. There is no tone associated with the initials. Therefore each individual initial is modeled as a single phoneme. With respect to the 48 finals, there are certain finals that have five tones associated with them while other finals have less than five tones associated with them (e.g., certain finals only have four tones associated with them, etc.). Finals having the same phonetic structure but different tones are defined and modeled as different phonemes. Therefore, each of the 48 base finals may have up to five corresponding toned phonemes. Accordingly, a basic tonal phoneme set contains 178 phoneme units that include up to five toned phonemes for each of the 48 base finals. In one embodiment, a number of fifth tone units are added to the tonal phoneme set for certain finals that traditionally do not have the fifth tone associated with them. By adding these fifth tone units, the size of the tonal phoneme set increases from 178 to 185 units. With respect to those finals for which the fifth tone units were added to the tonal phoneme set, a pronunciation with the fifth tone for the corresponding words were also added to the pronunciation dictionary. At the word level, as described above, a set of tone change rules is used to build transcription for training data and pronunciation lattices for decoding. In one embodiment, there are 9 tone change rules that are designed and implemented to model the tone influence at the word level as follows:

(a) There are four tone change rules for word with 3 syllables as shown below:

| (1) | 3 3 3 | → | 2 2 3 |
| (2) | 1 * 3 | → | 1 2 3 |
| (3) | 2 * 3 | → | 2 2 3 |
| (4) | 4 * 3 | → | 4 2 3 |

In the above description, rule "333→223" means that those words with three third toned syllables ("333") are pronounced as second tone for the first two syllables and third tone for the last syllable ("223"). Rule "1*3→123" means that any toned syllable between a first toned syllable (the first syllable with the first tone) and a third toned syllable (the last syllable with the third tone) is pronounced as second toned syllable. Similarly, rule "2*3→223" means that any toned syllable between a second toned syllable (the first syllable with the second tone) and a third toned syllable (the last syllable with the third tone) is pronounced as second toned syllable. Accordingly, rule "4*3→423" means that any toned syllable between a fourth toned syllable (the first syllable with the fourth tone) and a third toned syllable (the last syllable with the third tone) is pronounced as second toned syllable.

(b) One rule for words that have 2 third toned syllables as follows:

33→23

This rule means the third toned syllable that is followed by another third toned syllable is pronounced as second toned syllable.

(c) There are four rules for words with a first toned syllable being one of "yi1", "qi1", or "ba1" (in Pin-Ying notations) followed by a fourth toned syllable, in this case "bu4" (in Pin-Ying notation), the first toned syllables in these instances are pronounced with second tone.

The 9 tone change rules described above are used to build transcription for training utterances and pronunciation lattices for decoding.

For tone integration at the sentence level, there are some sentence ending words that were not included in the original pronunciation dictionary. In addition, the pronunciation variations of these words when they are in the ending place of a sentence were not included in the original pronunciation dictionary. To facilitate the tone integration at the sentence level, these sentence ending words and their corresponding pronunciation variations have been added to the pronunciation dictionary.

Figure 2:
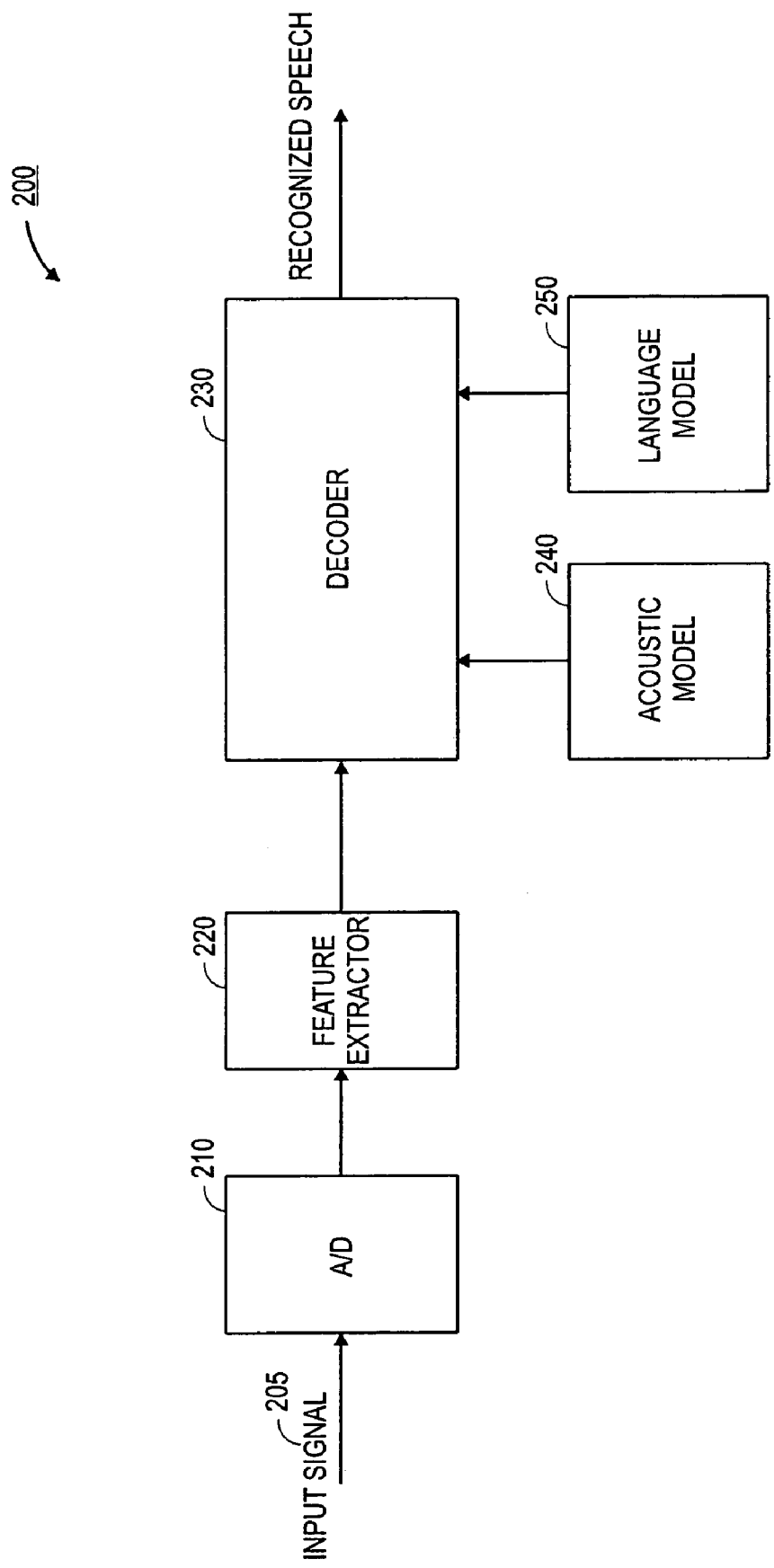
FIG. 2 is a block diagram of one embodiment of a speech recognition system according to the teachings of the present invention.

FIG. 2 illustrates a block diagram of one embodiment of a speech recognition system 200 according to the teachings of the present invention. The system 200, as shown in FIG. 2, includes an analog to digital converter (A/D) 210, a feature extractor or spectral analysis unit 220, a decoder 230, an acoustic model 240, and a language model 250. An input signal 205 representing the input speech is first digitized using the A/D 210. The digital signal is then sliced up into frames typically of 10, 15, or 20 ms. Each frame of the signal is then converted into a corresponding feature vector which is used to characterize the spectral properties of the input signal. In the present embodiment, the feature vector is a multi-dimensional vector and has a plurality of feature components including pitch feature. In one embodiment, MFCCs, delta MFCCs, and delta-delta MFCCs are also taken as components of the acoustic feature vectors, in addition to the pitch values. The feature vectors generated by the feature extractor unit 220 are then inputted into the decoder 230 which determines the sentence or sequence of words that has the highest probability given the acoustic events characterized by the feature vectors, based upon the acoustic model 240 and the language model 250. The acoustic model 240, in the present embodiment, includes a tonal phoneme set that is designed and constructed as described above. In particular, as discussed above, finals that have the same phonetic structure but different tones are defined and modeled as different phonemes. Therefore, each of the 48 base finals may have up to five corresponding toned phonemes. In the present embodiment, a number of fifth tone units are added to the tonal phoneme set for certain finals that traditionally do not have the fifth tone associated with them. By the addition of these fifth tone units, the size of the tonal phoneme set increases from 178 to 185 units. With respect to those finals for which the fifth tone units were added to the tonal phoneme set, a pronunciation with the fifth tone for the corresponding words were also added to the pronunciation dictionary. At the word level, as described above, a set of tone change rules is used to build transcription for training data and pronunciation lattices for decoding. In one embodiment, there are 9 tone change rules that are designed and implemented to model the tone influence at the word level. These 9 tone change rules are described in details above. Furthermore, to model the tone influence at the sentence level, a number of sentence ending words and their corresponding pronunciation variations have been added to the pronunciation dictionary.

Figure 3:
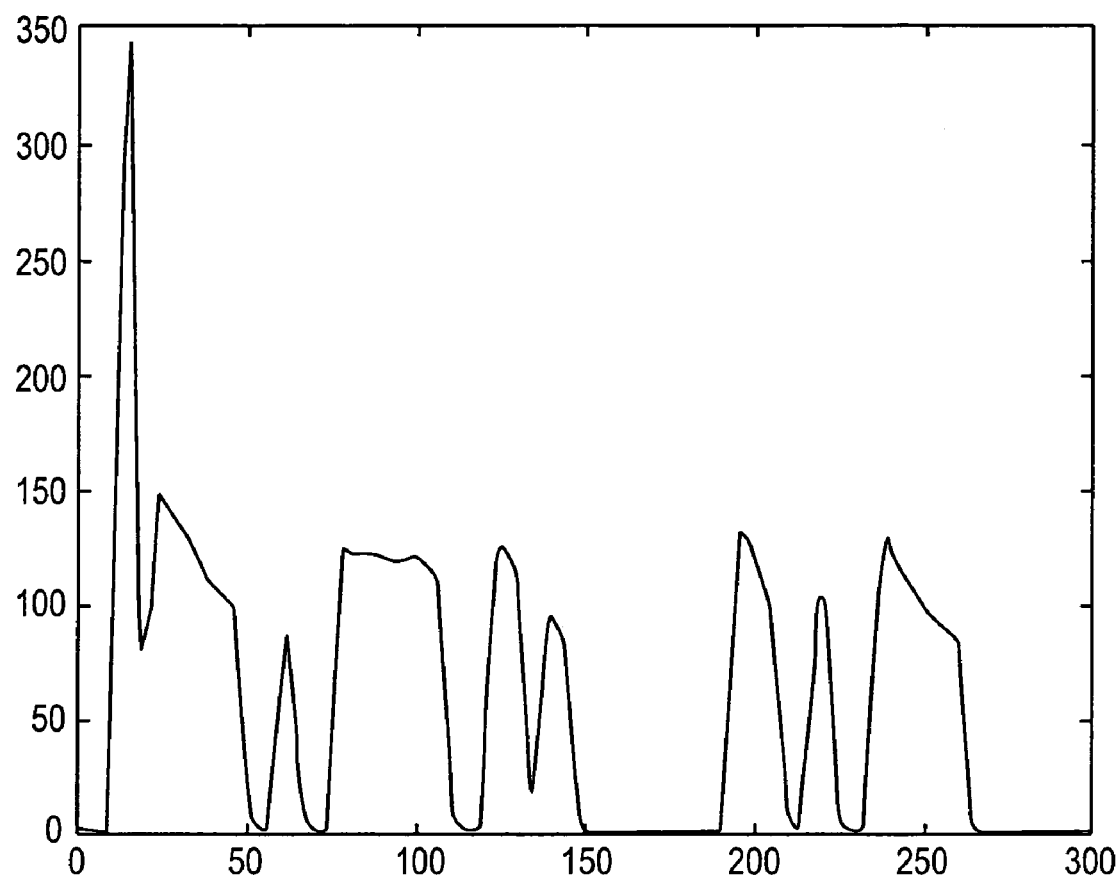
FIG. 3 shows an example of the measured pitch contour before smoothing.

Referring again to FIG. 2, in one embodiment, the pitch parameters are extracted from the speech signal using an average magnitude difference function (AMDF) method. According to the general understanding, pitch can only be defined for voiced frames of speech. Pitch does not exist for silence and unvoiced sections. FIG. 3 shows an example of the measured pitch contour of a four-syllable phrase, using a AMDF approach. As illustrated in FIG. 3, the pitch is undetermined during silence frames and frames of unvoiced consonants. At those frames, the derivatives of pitch would become zero. At the boundaries of a voiced section and an unvoiced section, the derivatives of pitch would become infinity. In both cases, problems will occur during training and decoding. In one embodiment, the following smoothing treatment is used to solve the problem as follows:

(1) A running average is calculated based on all valid points;

(2) At the beginning of an utterance, the pitch value is defined as the running average plus a random noise;

(3) When the speech proceeds from a voiced section to an unvoiced section, the pitch is defined as an exponential decay function towards the running average, plus a random noise;

(4) The entire signal is passed through a frequency domain low-pass filter to remove spikes.

Figure 4:
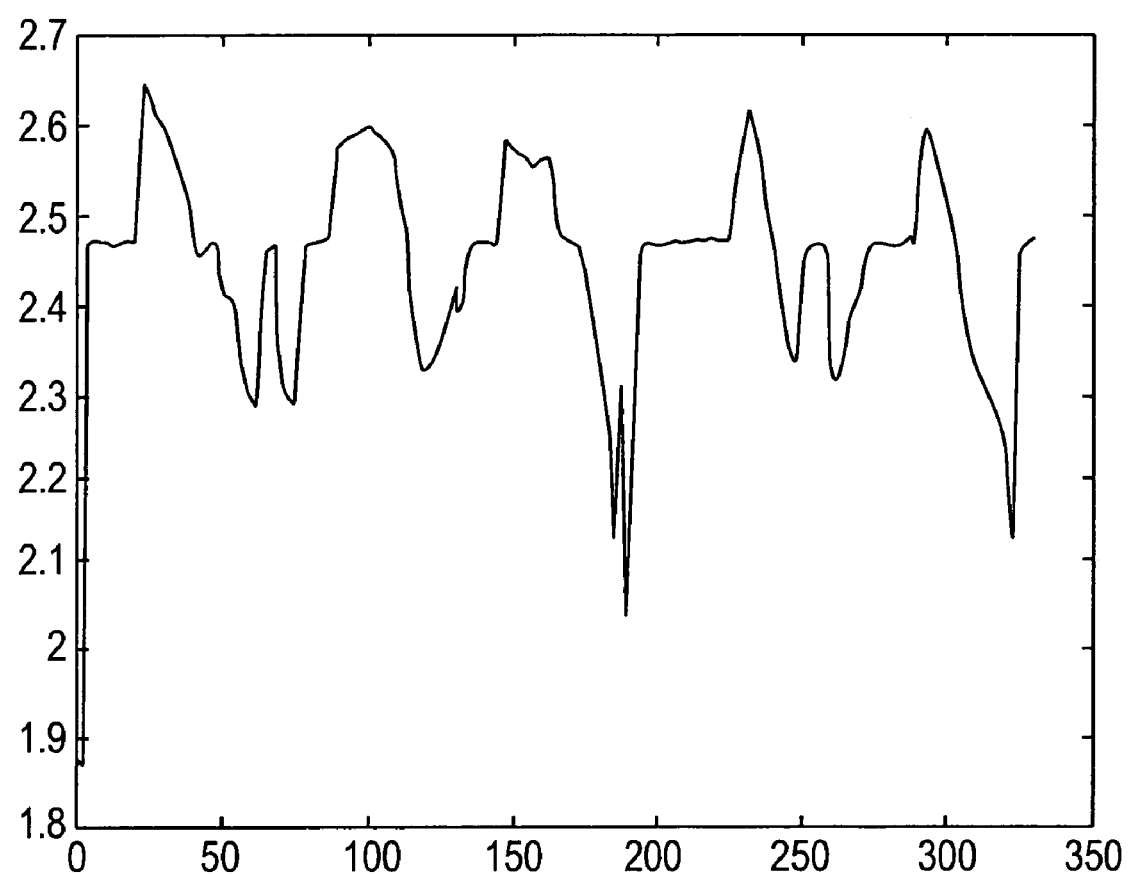
FIG. 4 shows an example of the pitch contour after smoothing.

The addition of the random noise to the unvoiced section is used to avoid zero variance in a frame where pitch is not a significant variable. FIG. 4 shows the pitch contour after smoothing for the same utterance shown in FIG. 3. As shown in FIG. 4, the pitch after smoothing is a well-behaved parameter which can be processed the same way as a cepstrum. In one embodiment, the logarithm of the pitch value is also taken as one of the elements of the pitch feature. It should be noted that there is a balance between the accuracy and the smoothness of pitch estimation, especially at the boundaries from voiced sections to unvoiced sections.

Figure 5:
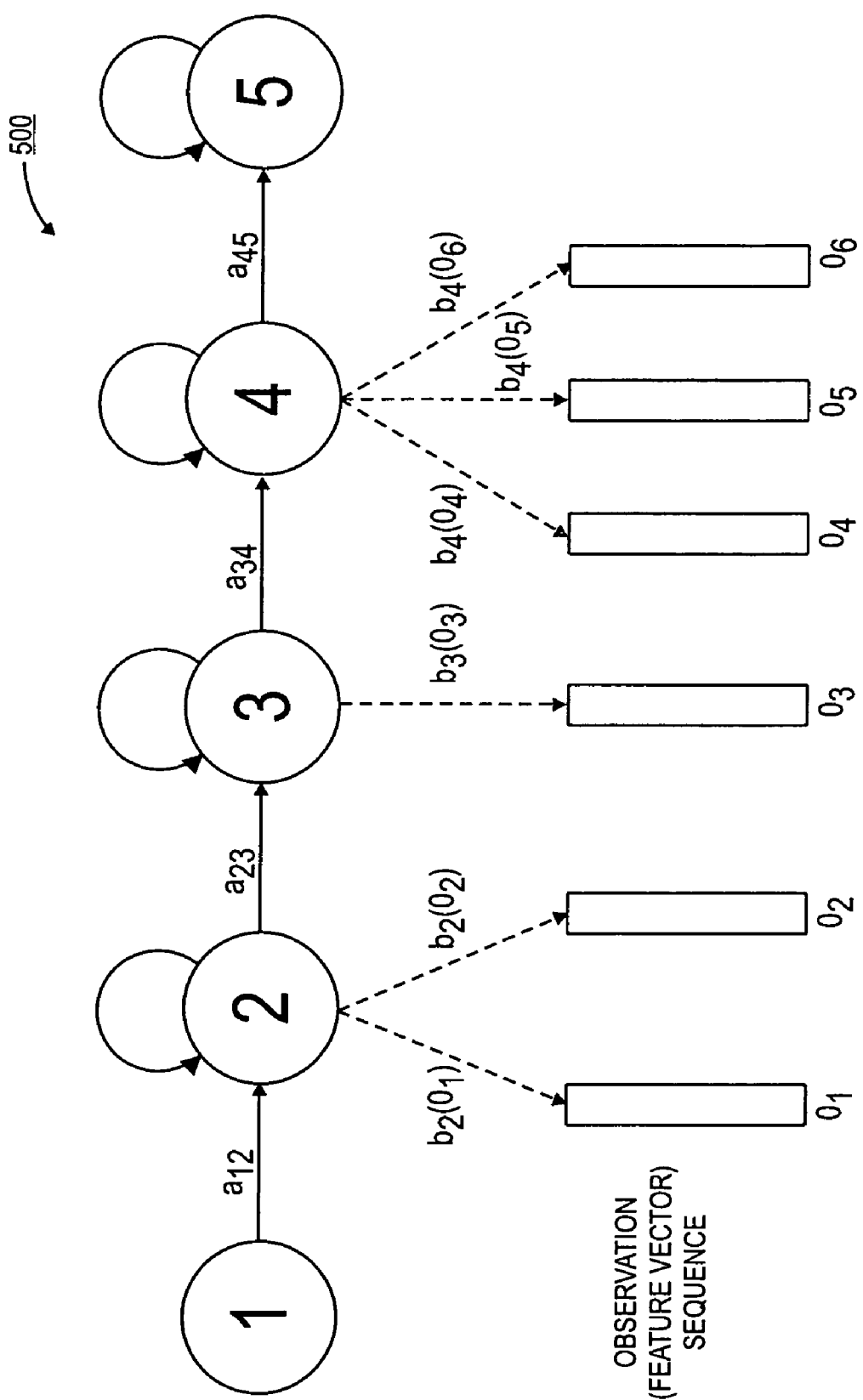
FIG. 5 is a diagram illustrating an HMM-based phone model.

FIG. 5 illustrates a diagram of one embodiment of an HMM-based phoneme model structure used in the acoustic model 240 to model a phonetic unit according to the teachings of the present invention (e.g., each initial is represented as a single phoneme and each toned final is represented as a single phoneme). Each individual phonetic unit is represented or modeled by a corresponding HMM. As shown in FIG. 4, an HMM has a set of sequence of states (1–5) that are connected by a set of transition probabilities ($a_{12}$, $a_{23}$, $a_{34}$, $a_{45}$), and a set of observation probabilities or likelihoods ($b_2(o_1)$, $b_2(o_2)$, $b_3(o_3)$, $b_4(o_4)$, $b_4(o_5)$, $b_4(o_6)$). Each transition probability $a_{ij}$ represents the probability of transitioning from a state i to a state j. Each observation probability or distribution $b_i(o_j)$ represents the probability of an observation vector $o_j$ being generated from a state i. Thus, the transition probabilities model the durational variability in speech and the output probabilities model the spectral variability. Accordingly, the set of states, the set of transition probabilities and the set of output probabilities are the parameters that are used to define an HMM. The HMM shown in FIG. 5 has a left-right topology. In the present embodiment, each state output distribution or observation probability function is modeled by a multivariate mixture Gaussian as follows:

$$b_j(o_t) = \sum_{k=1}^{M} c_{jk} N(o_t, m_{jk}, V_{jk})$$

where $c_{jk}$ is the weight of mixture component k in state j and $N(o_t, m_{jk}, V_{jk})$ denotes a multivariate Gaussian of mean $m_{jk}$ and covariance $V_{jk}$ for the kth mixture component in state j.

Figure 6:
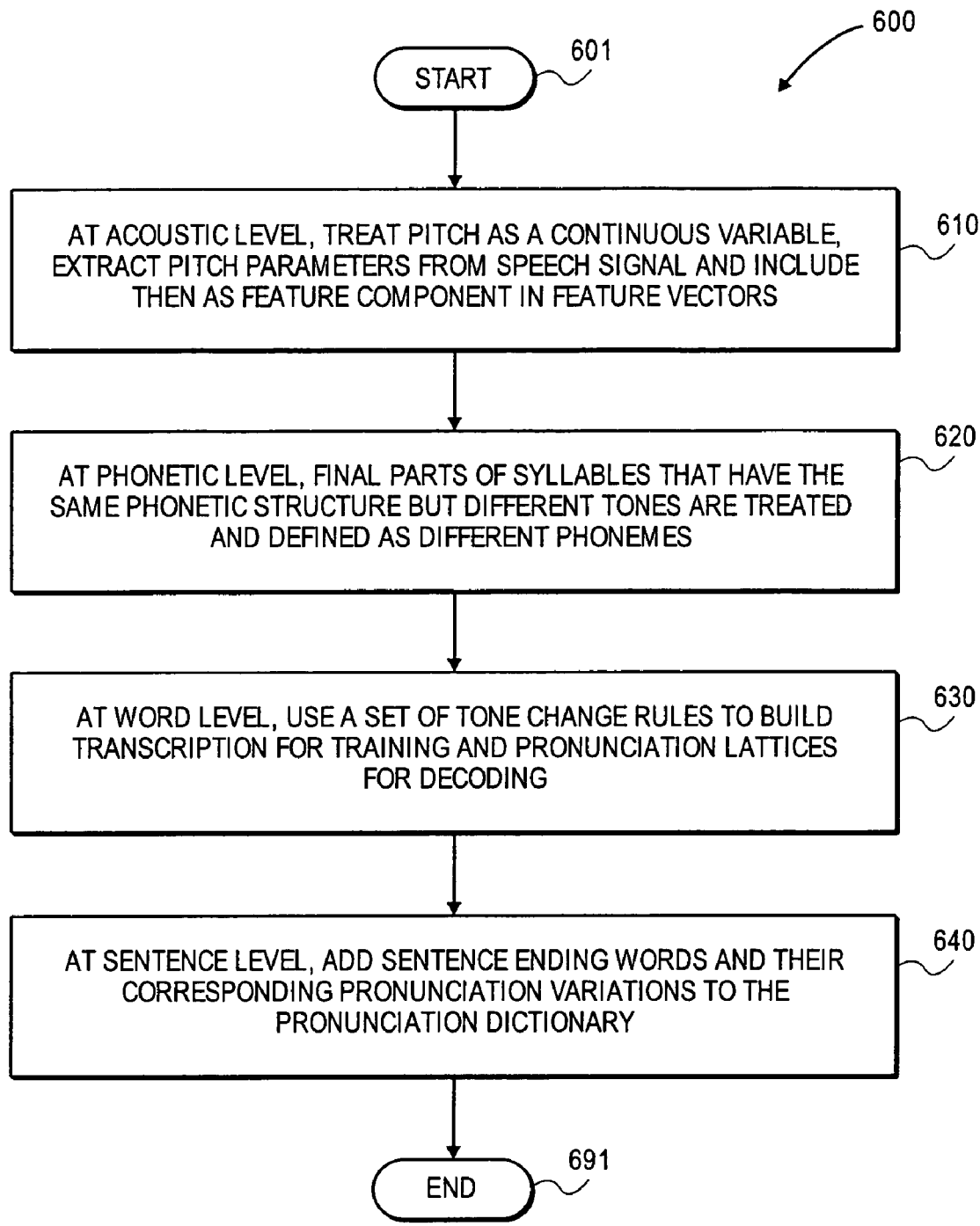
FIG. 6 shows a flow diagram of one embodiment of a method according to the teachings of the present invention.

FIG. 6 shows a flow diagram of one embodiment of a method 600 according to the teachings of the present invention wherein the tone influence is modeled at various levels in a bottom-up recognition structure. At block 610, at the acoustic level, pitch is treated as a continuous variable such as cepstra or energy. Pitch information is extracted from the speech signal and included as feature component in the feature vectors. At block 620, at the phonetic level, the final parts of syllables that have the same phonetic structure but different tones are treated and defined as different phonemes (e.g., a main vowel with different tones are defined as different phonemes) in the tonal phoneme set. A number of fifth tone units are also added to the tonal phoneme set for certain final parts that traditionally do not have a fifth tone associated with them. At block 630, at the word level, a set of tone change rules as described above is used to build transcription for training data and pronunciation lattices for decoding. At block 640, at the sentence level, a number of sentence ending words and their corresponding pronunciation variations are added to the pronunciation dictionary to model the tone influence at the sentence level.

Figure 7:
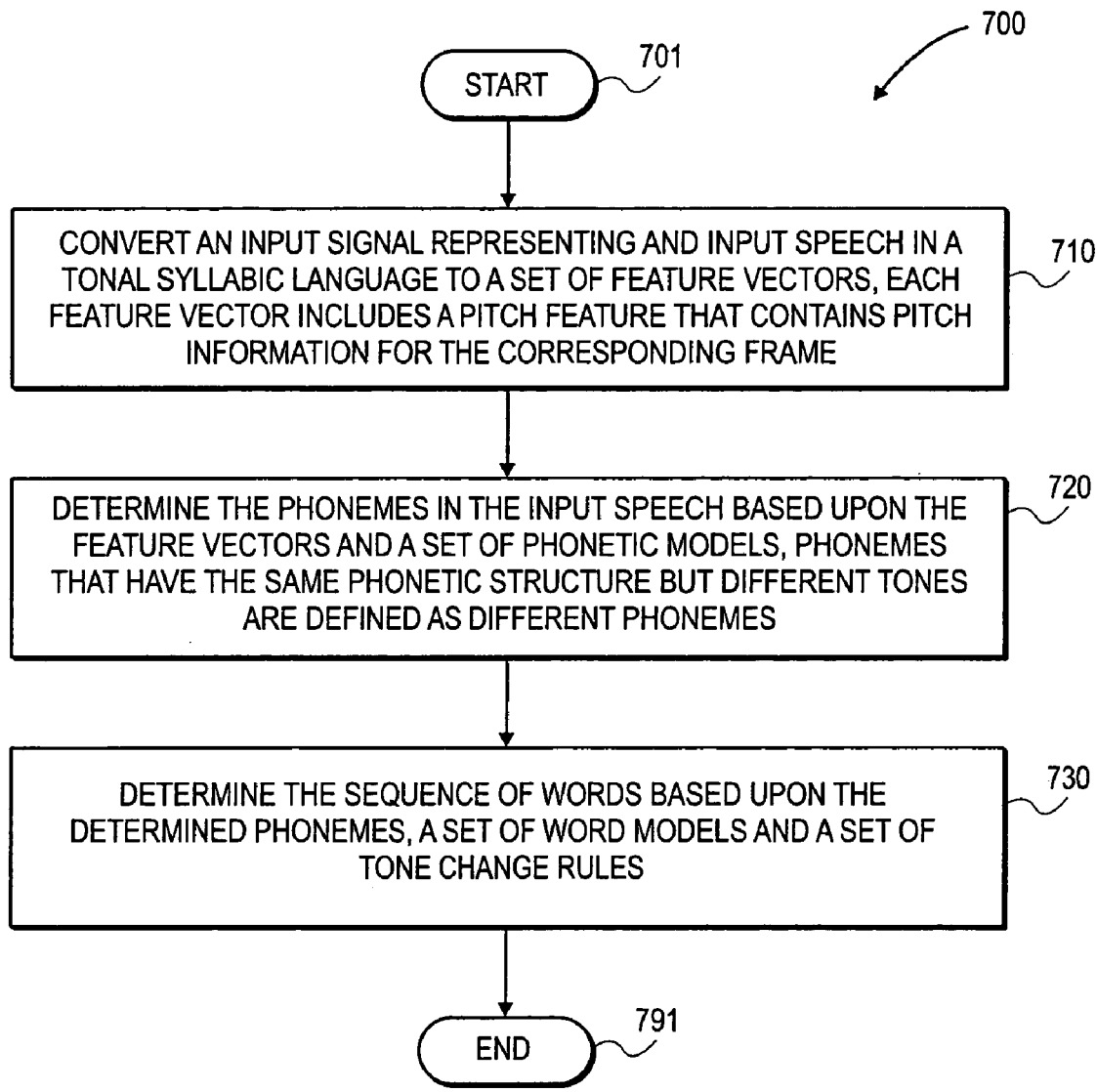
FIG. 7 shows a flow diagram of one embodiment of a method according to the teachings of the present invention.

FIG. 7 illustrates a flow diagram of one embodiment of a speech recognition method 700 according to the teachings of the present invention. The method 700 starts at block 701 and proceeds to block 710. At block 710, an input signal that represents an input speech in a tonal syllabic language (e.g., Mandarin Chinese) is converted into a set of feature vectors. The input speech contains one or more words, each word contains one or more phonemes. Each feature vector represents a frame of the input speech and includes a pitch feature that contains the pitch information for the respective frame. At block 720, the phonemes contained in the input speech are determined based upon the feature vectors and a set of phonetic statistical models. Each phonetic model represents a distinct phoneme in a set of tonal phonemes. Phonemes that have the same phonetic structures but different tones are defined as different phonemes and represented by different phonetic models. At block 730, the words contained in the input speech are determined based upon the recognized phonemes, a set of word statistical models and a set of tone change rules. A word statistical model, in a one embodiment, is formed by concatenating the corresponding phonetic HMMs according to their pronunciation in a dictionary.

The invention has been described in conjunction with the preferred embodiment. It is evident that numerous alternatives, modifications, variations and uses will be apparent to those skilled in the art in light of the foregoing description.

What is claimed is:

1. A method comprising:
converting an input signal representing an input speech in a tonal syllabic language into a set of feature vectors, the input speech comprising one or more words, each word comprising one or more phonemes, each feature vector representing a frame of the input speech and including a pitch feature containing pitch information for the respective frame;
determining the phonemes contained in the input speech based upon the feature vectors and a set of phonemes, phonemes having same phonetic structures but different tones being defined as different phonemes; and
determining the words contained in the input speech based upon the determined phonemes, a set of word statistical models, and a set of tone change rules.

2. The method of claim 1 wherein each phonetic statistical model is represented by a corresponding hidden Markov model (HMM).

3. The method of claim 2 wherein the corresponding HMM is a continuous density HMM employing a Guassian mixture to represent the observation probability function associated with each state in the corresponding HMM.

4. The method of claim 2 wherein a word statistical model for each word is formed by concatenating the corresponding phonetic HMMs according to their pronunciation in a dictionary.

5. The method of claim 1 wherein converting comprises: extracting pitch parameters from the input signal.

6. The method of claim 5 wherein the pitch parameters are extracted using an average magnitude difference functions (AMDF).

7. The method of claim 5 wherein the pitch feature comprises the pitch values, the Mel-Frequency Cepstral Coefficients (MFCCs), the first and second derivatives of the extracted pitch parameters.

8. The method of claim 7 further comprising:
smoothing the pitch contour of the input signal, comprising:
calculating a running average of pitch values for all valid points in the input signal;
defining the pitch value of the beginning of the input signal as the running average plus a random noise signal; and
defining the pitch value of the transition from a voiced section to an unvoiced section as an exponential decay function towards the running average plus a random noise signal.

9. The method of claim 8 wherein the input signal is passed through a frequency domain low-pass filter to remove spikes from the input signal.

10. The method of claim 1 wherein the forward-backward algorithm is used to train the parameters of the phonetic statistical models which represent the corresponding phonemes.

11. The method of claim 1 wherein knowledge about tone characteristics in the tonal syllabic language is used to model speech at multiple levels in constructing statistical models and decoding speech based upon the statistical models in a bottom-up recognition structure, the multiple levels in the bottom-up recognition structure including acoustic level, phonetic level, word level, and sentence level.

12. The method of claim 11 wherein, at the acoustic level, pitch information corresponding to the tone of a given phoneme is streated as a continuous acoustic variable and included in the feature vectors representing the given phoneme.

13. The method of claim 12 wherein, at the phonetic level, main vowels having same phonetic structures but different tones are considered different phonemes.

14. The method of claim 13 wherein, at the word level, a set of tone change rules is used to build transcription for training data and word lattice for decoding.

15. The method of claim 14 wherein, at the sentence level, a set of sentence ending words having a light tone is added to a system vocabulary for training and decoding speech in the tonal syllabic language.

16. A system comprising:
a model database comprising a set of phonetic statistical models each representing a distinct phoneme from a set of tonal phonemes, phonemes having same phonetic structures but different tones being classified as different phonemes;
a feature extraction unit to convert an input signal representing an input speech in a tonal syllabic language into a set of feature vectors, the input speech comprising one or more words, each word comprising one or more phonemes, each feature vector representing a frame of the input speech and including a pitch feature representing pitch information for the respective frame; and
a decoder unit to perform phoneme recognition to recognize the phonemes contained in the input speech based upon feature vectors and the statistical phonetic models and word recognition to recognize the sequence of words contained in the input speech based upon the recognized phonemes, a set of word statistical models, and a set of tone change rules.

17. The system of claim 16 wherein each phonetic statistical model is represented by a corresponding hidden Markov model (HMM).

18. The system of claim 17 wherein the word statistical model for each word is formed by concatenating the corresponding phonetic HMMs according to their pronunciation is a dictionary.

19. The system of claim 16 wherein the feature extraction unit uses an average magnitude difference function (AMDF) to extract pitch parameters from the input signal based.

20. The system of claim 19 wherein the pitch feature comprises the pitch values, the Mel-Frequency Cepstral Coefficients (MFCCs), the first and second derivatives of the extracted pitch parameters.

21. The system of claim 16 wherein, in order to smooth the pitch contour of the input signal, the pitch value of the beginning of the input signal is defined as a running average plus a random noise signal, the pitch value of a segment from a voiced section to an unvoiced section is defined as an exponential decay function towards the running average plus a random noise signal and wherein the running average is calculated based upon pitch values for all valid points in the input signal.

22. The system of claim 21 wherein the input signal is passed through a frequency domain low-pass filter to remove spikes from the input signal.

23. The system of claim 16 wherein knowledge about tone characteristics in the tonal syllabic language is used to model speech at multiple levels in constructing statistical models and decoding speech based upon the statistical models in a bottom-up recognition structure, the multiple levels in the bottom-up recognition structure including acoustic level, phonetic level, word level, and sentence level.

24. The system of claim 23 wherein, at the acoustic level, pitch information corresponding to the tone of a given phoneme is treated as a continuous acoustic variable and included in the feature vectors representing the given phoneme, at the phonetic level, main vowels having same phonetic structures but different tones are considered different phonemes, at the word level, a set of tone change rules is used to build transcription for training data and word lattice for decoding, and at the sentence level, a set of sentence ending words having a light tone is added to a system vocabulary for training and decoding speech in the tonal syllabic language.

25. A machine-readable medium comprising instructions which, when executed by a machine, cause the machine to perform operations comprising:
converting an input signal representing an input speech in a tonal syllabic language into a set of feature vectors, the input speech comprising one or more words, each word comprising one or more phonemes, each feature vector representing a frame of the input speech and including a pitch feature containing pitch information for the respective frame;
recognizing the phonemes contained in the input speech based upon the feature vectors and a set of phonetic statistical models each representing a distinct phoneme in a set of tonal phonemes, phonemes having same phonetic structures but different tones being defined as different phonemes; and recognizing the words contained in the input speech based upon the recognized phonemes, a set of word statistical models, and a set of tone change rules.

26. The machine-readable medium of claim 25 wherein knowledge about tone characteristics in the tonal syllabic language is used to model speech at multiple levels in constructing statistical models and decoding speech in a bottom-up recognition structure, the multiple levels in the bottom-up recognition structure including acoustic level, phonetic level, word level, and sentence level.

27. The machine-readable medium of claim 26 wherein, at the acoustic level, pitch information corresponding to the tone of a given phoneme is treated as a continuous acoustic variable and included in the feature vectors representing the given phoneme.

28. The machine-readable medium of claim 26 wherein, at the phonetic level, main vowels having same phonetic structures but different tones are considered different phonemes.

29. The machine-readable medium of claim 26 wherein, at the word level, a set of tone change rules is used to build transcription for training data and word lattice for decoding.

* * * * *